United States Patent
Bae et al.

(10) Patent No.: US 9,161,218 B2
(45) Date of Patent: *Oct. 13, 2015

(54) SYSTEM AND METHOD FOR PROVISIONING OVER THE AIR OF CONFIDENTIAL INFORMATION ON MOBILE COMMUNICATIVE DEVICES WITH NON-UICC SECURE ELEMENTS

(75) Inventors: Sungwoo Bae, Seoul (KR); Donghyun Kim, Yongin-si (KR); Jaemin Lim, Seoul (KR); Daeman Kwon, Seoul (KR); Youngjin You, Seoul (KR); Kido Cheong, Yongin-si (KR)

(73) Assignee: MOZIDO CORFIRE—KOREA, LTD., Sungnam-si (KR)

( * ) Notice: Subject to any disclaimer, the term of this patent is extended or adjusted under 35 U.S.C. 154(b) by 167 days.

This patent is subject to a terminal disclaimer.

(21) Appl. No.: 13/310,344

(22) Filed: Dec. 2, 2011

(65) Prior Publication Data

US 2012/0172089 A1    Jul. 5, 2012

Related U.S. Application Data

(60) Provisional application No. 61/428,851, filed on Dec. 30, 2010, provisional application No. 61/428,846, filed on Dec. 30, 2010, provisional application No. 61/428,852, filed on Dec. 30, 2010, provisional application No. 61/428,853, filed on Dec. 30, 2010.

(51) Int. Cl.
    *H04W 12/06*    (2009.01)
    *H04W 12/04*    (2009.01)
    *H04L 29/06*    (2006.01)

(52) U.S. Cl.
    CPC ............. *H04W 12/06* (2013.01); *H04L 63/067* (2013.01); *H04W 12/04* (2013.01)

(58) Field of Classification Search
    CPC ... G06F 9/4401; G06F 9/4411; G06F 9/4416; H04L 67/04; H04L 67/16; H04L 67/34; H04L 63/067; H04L 67/28; H04L 67/2838; H04W 12/04; H04W 12/06
    USPC ........... 455/410, 411, 414.1, 558; 726/16, 17, 726/18, 27, 28, 30; 705/16, 41
    See application file for complete search history.

(56) References Cited

U.S. PATENT DOCUMENTS

| | | | |
|---|---|---|---|
| 5,221,838 | A | 6/1993 | Gutman et al. |
| 6,199,762 | B1 | 3/2001 | Hohle |

(Continued)

OTHER PUBLICATIONS

Calypso, Calypso Specification Application Download, Jan. 28, 2009, Calypso Network Association, version 1.*

(Continued)

*Primary Examiner* — Marcos Torres
*Assistant Examiner* — Hung Du
(74) *Attorney, Agent, or Firm* — Sughrue Mion, PLLC

(57) ABSTRACT

A method for over-the-air (OTA) provisioning a non-Universal Integrated Circuit Card (UICC) type secure element (SE) of a mobile device, including receiving a request to initialize an OTA proxy of a mobile device; initializing the OTA proxy; receiving provisioning data through the OTA proxy; and provisioning the received data into the SE, in which the SE is a non-UICC type SE. A mobile device to provision secure data OTA in a non-UICC type SE including an OTA proxy to connect to a Trusted Service Manager (TSM) system, and to receive provisioning data from the TSM system; a near-field-communication (NFC) enabled chip to conduct a contactless transaction; and a SE to store information provisioned through OTA proxy, in which the SE is a non-UICC type SE.

21 Claims, 10 Drawing Sheets

(56) References Cited

U.S. PATENT DOCUMENTS

| | | |
|---|---|---|
| 6,480,957 B1 | 11/2002 | Liao et al. |
| 6,487,403 B2 | 11/2002 | Carroll |
| 6,950,939 B2 | 9/2005 | Tobin |
| 7,024,390 B1 | 4/2006 | Mori et al. |
| 7,065,341 B2 | 6/2006 | Kamiyama et al. |
| 7,146,159 B1 | 12/2006 | Zhu |
| 7,149,545 B2 | 12/2006 | Hurst et al. |
| 7,155,411 B1 | 12/2006 | Blinn et al. |
| 7,197,297 B2 | 3/2007 | Myles et al. |
| 7,233,785 B2 | 6/2007 | Yamagishi et al. |
| 7,233,926 B2 | 6/2007 | Durand et al. |
| 7,236,742 B2 | 6/2007 | Hall et al. |
| 7,286,818 B2 | 10/2007 | Rosenberg |
| 7,389,123 B2 | 6/2008 | Rydgren et al. |
| 7,415,721 B2 | 8/2008 | Fransdonk |
| 7,447,494 B2 | 11/2008 | Law et al. |
| 7,454,233 B2 | 11/2008 | Lu et al. |
| 7,469,151 B2 | 12/2008 | Khan et al. |
| 7,490,775 B2 | 2/2009 | Biderman |
| 7,527,208 B2 | 5/2009 | Hammad et al. |
| 7,628,322 B2 | 12/2009 | Holtmanns et al. |
| 7,689,205 B2 | 3/2010 | Toy et al. |
| 7,689,508 B2 | 3/2010 | Davis et al. |
| 7,707,113 B1 | 4/2010 | DiMartino et al. |
| 7,708,194 B2 | 5/2010 | Vawter |
| 7,711,392 B2 | 5/2010 | Brown et al. |
| 7,819,307 B2 | 10/2010 | Lyons et al. |
| 7,822,439 B2 | 10/2010 | Teicher |
| 7,822,688 B2 | 10/2010 | Labrou et al. |
| 2005/0071419 A1* | 3/2005 | Lewontin ............... 709/201 |
| 2008/0010215 A1 | 1/2008 | Rackley, III et al. |
| 2008/0040265 A1 | 2/2008 | Rackley, III et al. |
| 2008/0208742 A1 | 8/2008 | Arthur et al. |
| 2009/0019167 A1* | 1/2009 | Taaghol ............... 709/228 |
| 2009/0124234 A1 | 5/2009 | Fisher et al. |
| 2009/0307139 A1 | 12/2009 | Mardikar et al. |
| 2009/0307140 A1 | 12/2009 | Mardikar |
| 2010/0125495 A1 | 5/2010 | Smith et al. |
| 2010/0125508 A1 | 5/2010 | Smith |
| 2010/0138518 A1 | 6/2010 | Aiglstorfer et al. |
| 2010/0145835 A1 | 6/2010 | Davis et al. |
| 2010/0205432 A1 | 8/2010 | Corda et al. |
| 2010/0211507 A1 | 8/2010 | Aabye et al. |
| 2010/0275242 A1 | 10/2010 | Raffard et al. |
| 2010/0275269 A1* | 10/2010 | Vilmos et al. ............... 726/28 |
| 2010/0291904 A1* | 11/2010 | Musfeldt et al. ............ 455/414.1 |
| 2010/0306107 A1 | 12/2010 | Nahari |
| 2010/0330958 A1 | 12/2010 | Corda et al. |
| 2011/0078081 A1 | 3/2011 | Pirzadeh et al. |
| 2012/0095852 A1* | 4/2012 | Bauer et al. ............... 705/16 |

OTHER PUBLICATIONS

GlobalPlatform, Card Specification, Version 2.2, published Mar. 2006.

* cited by examiner

Prior Art – SMS PP

TSM Details

Downloading OTA Proxy with SK C&C Wallet

Mobile Equipment Details

US 9,161,218 B2

SYSTEM AND METHOD FOR PROVISIONING OVER THE AIR OF CONFIDENTIAL INFORMATION ON MOBILE COMMUNICATIVE DEVICES WITH NON-UICC SECURE ELEMENTS

CROSS REFERENCE TO RELATED APPLICATION

This application claims priority from and the benefit under 35 U.S.C. §119(a) of U.S. Provisional Patent Application No. 61/428,851, filed on Dec. 30, 2010, which is incorporated by reference for all purposes as if fully set forth herein. Also, the present application is related to U.S. Provisional Patent Application Nos. 61/428,846, 61/428,852 and 61/428,853, all of which have been filed on December 30. Applicant hereby incorporates by reference the above-mentioned provisional applications, which are not admitted to be prior art with respect to the present invention by their mention here or in the background section that follows.

BACKGROUND

1. Field

The following description relates to over-the-air provisioning of virtual cards on a mobile device, such as a mobile communication terminal, with a non-Universal Integrated Circuit Card (UICC) type secure element.

2. Discussion of the Background

With the advent of advancing mobile technology, more features have been integrated into the mobile devices. From GPS applications to mobile office products, mobile device, such as a mobile communication terminal, has become a necessity for everyday needs. In order to further utilize mobile technology to better cater to consumer's daily requirements, attempts have been made to provide for a mobile financial management system to replace conventional physical wallets. Specifically, this mobile wallet functionality was sought to be realized through provisioning of card issuer's account information directly into a secure element (SE) of the mobile device equipped with Near Field Communication (NFC) chipset. Provisioning may refer to a process of preparing and equipping an apparatus with information (e.g., financial information) to allow it to provide one or more services to its users. The SE may be a smart card chip capable of storing multiple applications, including of account specific information that may not be easily accessed by external parties. The model mobile wallet application may have the same composition as a conventional wallet, which may contain payment cards, member cards, transportation cards, and loyalty cards.

Mobile wallet functionality may be further enhanced by provisioning the user financial credential onto mobile devices equipped with Near Field Communication chipset (NFC enabled). Once the user financial credentials have been provisioned onto the NFC enabled is mobile device, the provisioned NFC enabled device may transfer information or make payments to another NFC compatible device by coming near within a few centimeters of one another without physically contacting each other. This type of technology is conventionally referred to as "contactless" technology and a payment made with this technology is referred to as "contactless" payment. Despite the numerous benefits that are available utilizing the described technology, there has been no practical solution to provision sensitive user information to the NFC enabled mobile devices.

One possible solution for provisioning mobile wallet cards is to perform the provisioning at a secure facility controlled by the mobile wallet card issuer. However, this solution may require users to bring their mobile device to the physical mobile wallet card issuer for provisioning. This process has to be repeated for every mobile wallet card the user seeks to provision at different card issuer facility, making the concept of utilizing mobile wallet application impractical.

In light of this limitation, a new system and method has been developed providing for over-the-air (OTA) provisioning. Rather than relying on provisioning at physical locations, a method for provisioning financial account information via OTA has been sought. Through technological advancement, OTA provisioning has been provided for mobile device with the SE types of UICC, Services Identity Module (SIM), Universal Subscriber Identity Module (USIM) to (herein referred collectively as UICC) cards via industry standard Short Message Service Point to Point (SMS-PP) and Bearer Independent Protocol (BIP) protocols. However, while SMS-PP protocol and Bearer Independent Protocol BIP allow OTA provisioning for UICC cards and their equivalents, it does not allow for OTA provisioning of MicroSD's and Embedded SEs (i.e. non-UICC SEs), which may not support conventional Subscriber Identity Module Application is Toolkit (SAT)/Universal Subscriber Identity Module Application Toolkit (USAT)/Card Application Toolkit (CAT) framework. As such, any mobile device with SE types MicroSD, Embedded SE, or other non-UICC SE type that does not support SMS-PP or BIP protocol may not be provisioned OTA with the conventional technology.

FIG. 1 illustrates a system diagram of a conventional OTA provisioning process through SMS PP protocol. FIG. 2 is a corresponding flow diagram illustrating a conventional method for OTA provisioning to mobile device using SMS PP protocol. Specifically, the referenced figures will provide for OTA provisioning via SMS PP protocol.

Typically, before the request is made to provision a mobile device, it is assumed that that the MNO has already registered all of its information including OTA key information in step 201 in an offline batch process. Once MNO registers all of the necessary information, mobile device may be ready for provisioning.

To begin the provisioning process, a user makes a request to a financial institution 18 to provision a mobile wallet card, in step 202. Then, the financial institution 18 will process the request and send the request along with necessary identifiers, such as Mobile Subscriber Integrated Services Digital Network Number (MSISDN) along with provisioning data to MNO OTA server 16 in step 203. MNO OTA Server 16 will then transmit the provisioning command to the mobile device 11 directly via SMS-PP protocol in step 204. MNO OTA Server 16 and MNO 19 may be owned by the same entity but illustrated as two different entities to show the different functions performed by the individual elements. More specifically, MNO 19 is shown only in step 201 to illustrate the pre-registration step that is performed by the MNO 19. Once registered, MNO OTA server primarily interacts with the mobile device 11 to provision the information provided by financial institution 18. Lastly, in step 205, mobile device 11 receives is the message and performs the provisioning process into its SE (e.g., USIM, SIM, UICC).

SUMMARY

Exemplary embodiments of the present invention provide a mobile device to provision information into a non-Universal Integrated Circuit Card (UICC) type secure element (SE) through an over-the-air (OTA) proxy. Exemplary embodiments of the present invention also provide a method for OTA provisioning a non-UICC SE of the mobile device.

Additional features of the invention will be set forth in the description which follows, and in part will be apparent from the description, or may be learned by practice of the invention.

Exemplary embodiments of the present invention provide a method for OTA provisioning a non-UICC type SE of a mobile device including receiving a request to initialize an OTA proxy of a mobile device, initializing the OTA proxy, receiving provisioning data through the OTA proxy, and provisioning the received data into the SE, the SE being a non-UICC type SE.

Exemplary embodiments of the present invention provide a method for OTA provisioning a non-UICC type SE including receiving a request to initialize an OTA proxy of a mobile device from a Trusted Service Manager (TSM) system; initializing the OTA proxy; communicating, by the mobile device, with the TSM system through the OTA proxy; retrieving mobile device information and SE information, in which the SE information includes an SE status and an SE type; receiving a key from the TSM system for accessing the SE, in which the key includes at least one of an initial issuer master key and a final issuer master key; securing the SE by injecting the corresponding key to the SE based on its status; receiving provisioning data; and provisioning the received data into the SE, the SE being a non-UICC type SE.

Exemplary embodiments of the present invention provide a mobile device to provision secure data OTA in a non-UICC type SE including an OTA proxy to connect to a TSM system, and to receive provisioning data from the TSM system; a near-field-communication (NFC) enabled chip to conduct a contactless transaction; and a SE to store information provisioned through OTA proxy, the SE being a non-UICC type SE.

It is to be understood that both foregoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
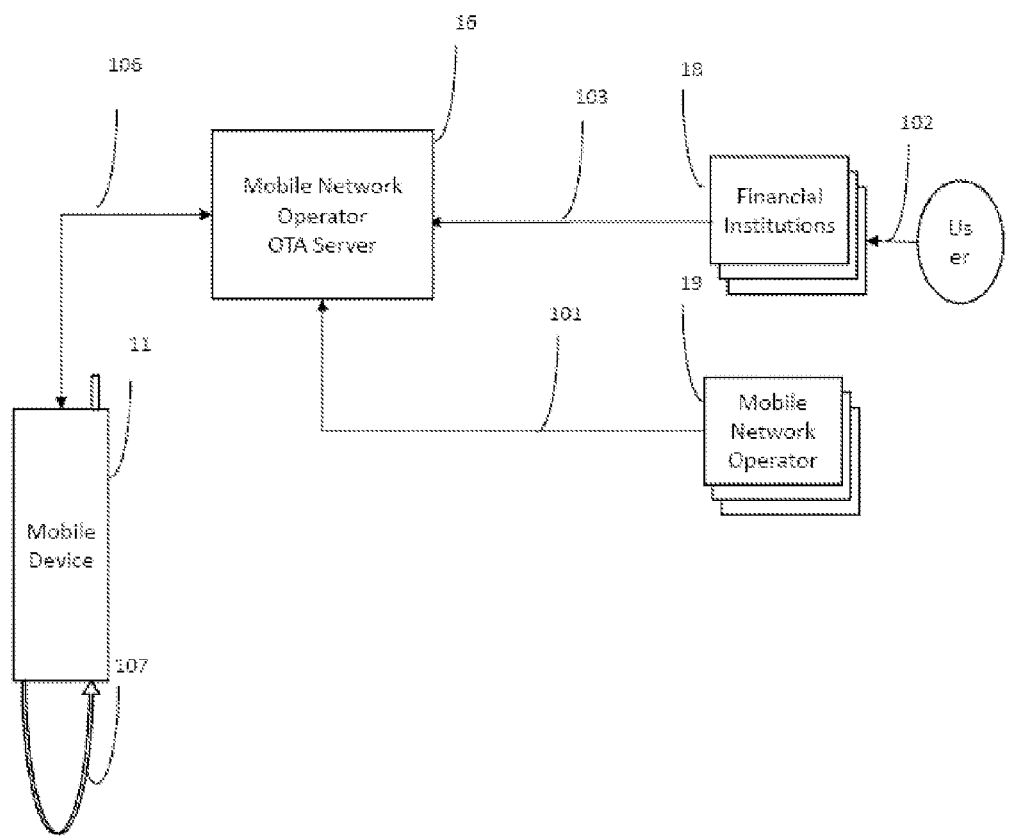
FIG. 1 is a system diagram of a prior art OTA provisioning process through SMS PP protocol.
Figure 2:
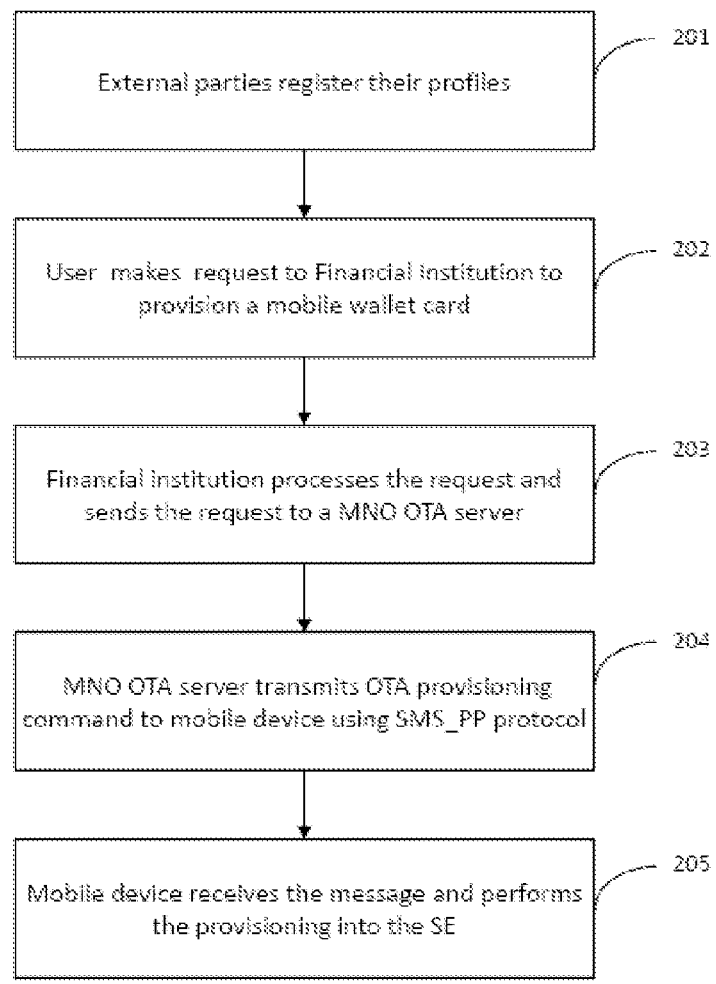
FIG. 2 is a flow diagram illustrating a method for prior art OTA provisioning process through SMS PP protocol.

The invention is described more fully hereinafter with references to the accompanying drawings, in which exemplary embodiments of the invention are shown. This invention may, however, be embodied in many different forms and should not be construed as is limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Figure 3:
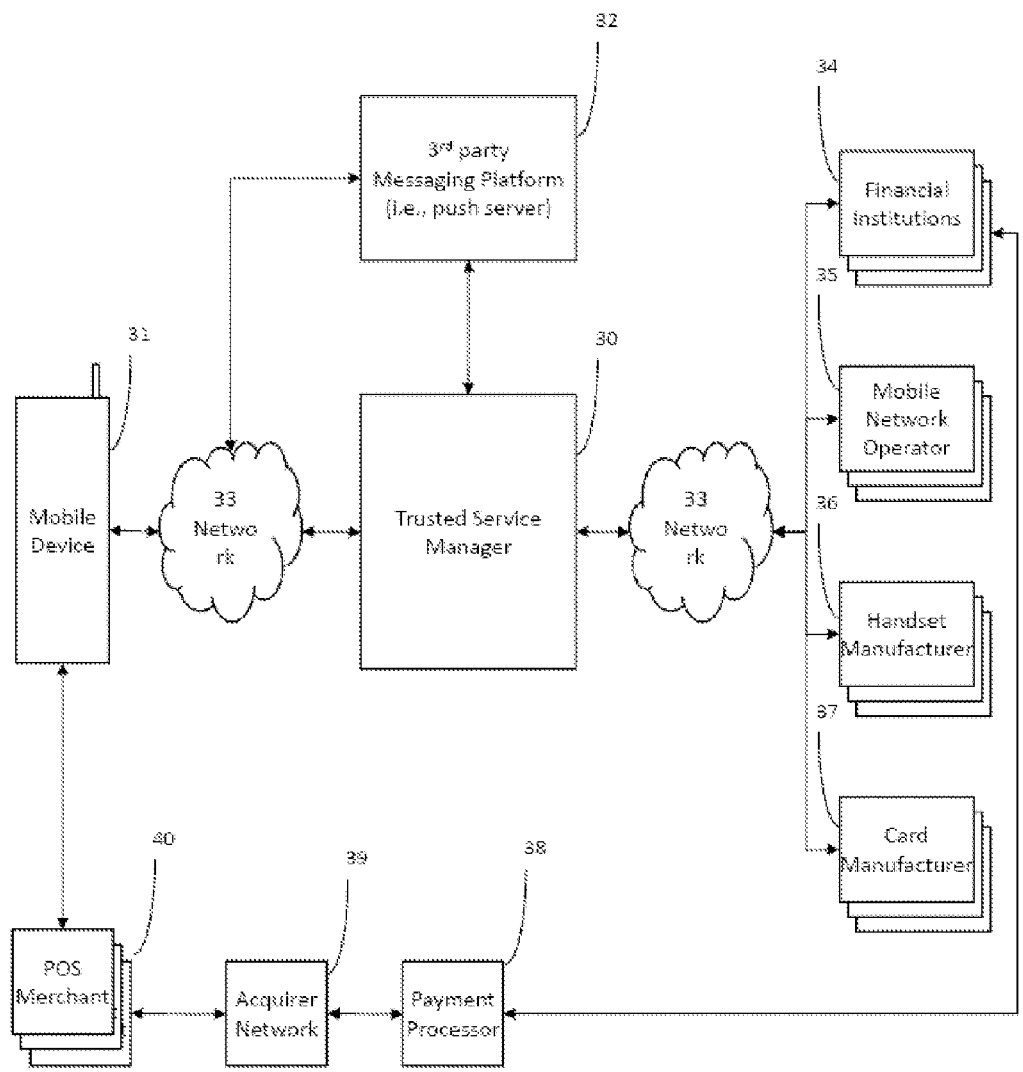
FIG. 3 is a system diagram of a TSM ecosystem supporting the OTA provisioning process through OTA proxy according to an exemplary embodiment of the present invention.

FIG. 3 is a system diagram of a Trusted Service Manager (TSM) ecosystem supporting the over-the-air (OTA) provisioning process through OTA proxy according to an exemplary embodiment of the present invention.

As shown in FIG. 3, an example system employing TSM technology with OTA proxy provisioning includes a TSM system 30; mobile device 31; third party messaging platform 32; network 33; financial institution 34; Mobile Network Operator (MNO) 35; handset manufacturer 36; and card manufacturer 37. Before TSM system may be fully utilized by the user and its participants, service providers (SP) such as identified in 34-37 typically go through a pre-registration process such as that outlined in FIG. 5.

The handset manufacturers 36 may include embedded secure element (SE) producer, and card manufacturers 37 may include producers of micro secure digital (SD) SE. As different SE manufacturer may provide for a different OTA keys than Universal Integrated Circuit Card (UICC) SE devices, handset manufacturers 36 and card manufacturers 37 may is provide their OTA keys to their respective devices in the pre-registration process mentioned above.

Exemplary embodiments of the invention provide for OTA proxy to be connected with TSM system only during usage as it will conserve technical resources. As such, OTA proxy will be in a sleep mode as a default until it is awaken for its utility. To provide for an awakening mechanism, a third party messaging platform 32 (e.g. Cloud to Device Messaging (C2DM)) may be utilized to wake the OTA proxy, which in turn will connect with the TSM system for usage. In an example, the third party messaging platform 32 may also be used to send a Short Message Service (SMS) message or a Multimedia Messaging Service (MMS). When TSM system sends a message to the third party messaging platform 32 (i.e., a push message server), with the wake up command and identifying information, the third party messaging platform 32 in turn sends a message to the identified mobile device to wake up OTA proxy residing within the mobile device. Once awake, OTA proxy will collect the mobile device and SE information and connect to the TSM system for provisioning or other utility.

Finally, once the mobile device 31 has been provisioned with contactless card applets and is NFC enabled, an owner of the mobile device may make a purchase at the NFC enabled Point-of-Sale (POS) 40 merchant by waving the NFC enabled mobile device at the corresponding NFC enabled POS device. Subsequently, once a purchase is made with the NFC enabled mobile device, the acquirer network 39 and payment processor 38 work together to ensure the payment gets updated at the financial institution 34. This end user application, however, does not involve the described TSM ecosystem and is illustrated to provide a description of a complete ecosystem.

Figure 4:
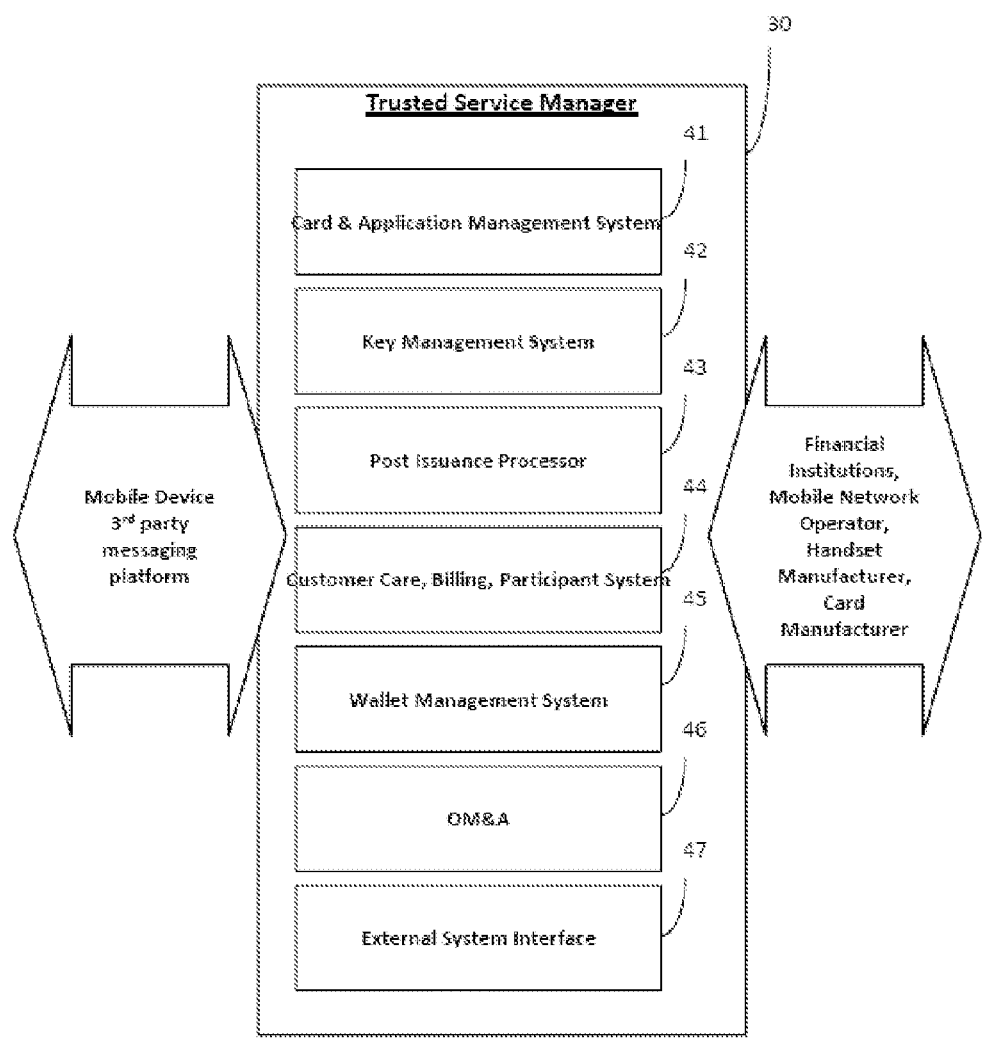
FIG. 4 is a block diagram of an example TSM system, its components, and its is relationship with external parties according to an exemplary embodiment of the present invention.

Further, a TSM system may include multiple components for more efficient processing. FIG. 4 is a system diagram illustrating a TSM system and its relationship to external parties according to an exemplary embodiment of the present invention.

A TSM system 30 may be comprised of a Card & Application Management System (CAMS) 41; Key Management System (KMS) 42; Post Issuance Processor (PIP) 43; Customer Care, Billing, Participant System (CBPS) 44; Wallet Management System (WMS) 45; Operation Maintenance & Administration (OM&A) 46; and External System Interface (ESI) 47.

Component CAMS 41 may be responsible for managing life cycle of SE, secure domains, and applets. Life cycle refers to the various status of the respective device or application. In an example, life cycle of a SE may include Operating System (OS) native, initialized, and secured. Life cycle of an applet may include lock and unlock. Some of the functionalities offered by the CAMS 41 will be management of SE type, SE profile, SE ID, application profile, and card profile. Each SE is identified individually and controlled by CAMS 41 with its own SE ID (Card Reference Number (CRN), Card Image Number (CIN), Card Production Life Cycle (CPLC), Card Serial Number (CSN)).

Component KMS 42 may be responsible for all of key management for allowing secure transactions. This may include secure log in, access control, audit, key profile management, key management, key profile exchange and recovery, and delegated management.

Component PIP 43 is primarily responsible for provisioning information into the mobile device, which may include preparation of data to be provisioned and the actual execution of sending and receiving provisioning messages provided in Application Protocol Data Units (APDU). APDU may refer to a communication unit between a reader and a card. The structure of the APDU described in more detail by the ISO 7816 standards.

Component CBPS 44 may be responsible for customer management. It may keep is customer account status as well as link data once SP requests service subscription. The CBPS 44 may modify the status of the SPs related to the customer as specified events occur (e.g. stolen handset) or as requested by the SP.

Component WMS 45 may be responsible for management of wallet application and its associated mobile card widgets stored therein. This component may provide a mobile ID to associate the wallet application stored in the user's mobile device as well as all of the individual widgets stored in the wallet application. In addition, this component will store any of the user preferences made by the wallet owner (e.g. language, font, default card, etc.). This component may hold the master configuration which may provide synchronization benefit for the wallet application.

Component OM&A 46 may be responsible for overall system monitoring and maintenance. Further, OM&A may also facilitate external managers to access TSM directly.

Component ESI 47 may provide for an interface for all external parties to send and receive data. As external parties may have specific protocol they utilize, ESI 47 has the capability to translate commands and requests arriving or leaving the TSM system as necessary.

All of the above described components may reside within the TSM system or separately as deemed necessary.

The described TSM system is a third party entity positioned to consolidate all of the information from various service providers (SP) including, financial institutions, MNOs, Handset Manufacturers, and Card Manufacturers. As TSM holds all of the information from various parties, the mobile device need only to interact with the TSM system rather than various discrete entities. In sum, the described TSM system acts as an integration point for all of the external parties the mobile device may have to deal with, providing for a seamless and more is efficient operation of mobile services.

Figure 5:
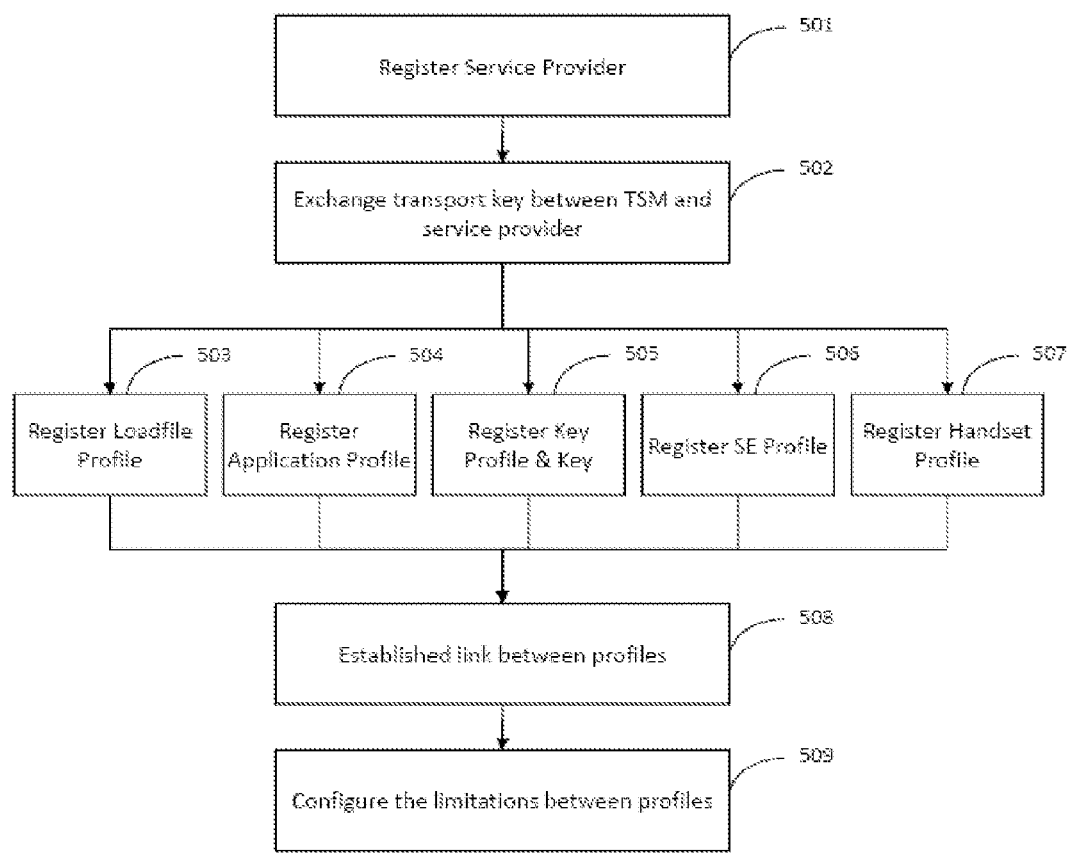
FIG. 5 is a flow diagram illustrating steps a service provider must take in order to take advantage of the TSM architecture according to an exemplary embodiment of the present invention.

FIG. 5 illustrates a pre-registration process that may take place before provisioning services into the mobile device according to an exemplary embodiment of the invention. In an example, SPs may first register their information into the TSM system for use by the TSM system. A SP may be any entity that seeks to provision its services onto the end mobile device.

In step 501, SPs' information has been registered into the TSM system. This process may be achieved by various methods. For example, the SP may send an encrypted email with basic registration information along with PGP public key. Registration may be achieved in person, by phone, through an automated system or any other method available to exchange information. TSM administrator may then enter SP's basic information into the TSM system and provide a unique SP ID, transport key ID, and the participant type (MNO, service provider, SE manufacturer, application). TSM administrator may be a person, an automated system, or a separate entity. Afterwards, TSM system may creates a participant account and generate secure token for the correlating SP ID. Once that is accomplished, TSM encrypts the SP account information in an encrypted email to send to the requesting SP.

In step 502, a transport key is exchanged between the TSM system and the SP. Transport key serves to provide secure transmission of sensitive data between various parties. Such security may be provided through encryption, cryptographic transformation of data through Message Authentication Code (MAC), or other conventional security measures. The SP requests transport key sets to the TSM system. The TSM checks for duplicate keys assigned to the requesting SP, and if no such key has been assigned, then TSM generates transport key sets inside a Hardware Security Module (HSM). In an example, transport key sets may include three is numbered keys including an encryption key (ENC), data encryption key (DEK), and message authentication code (MAC). TSM exports the generated keys in an encrypted form using the PGP key provided by the SP in step 501. Once the transport key set has been exchanged between the parties, the following SP related profiles may be provided to the TSM system: Loadfile Profile 503, application profile 504, key profile & key 505, SE profile 506, and handset profile 507.

Loadfile profile 503 describes the application code file that could contain one or more applications or describes the load files that make up an application code. Application profile 504 describes a smart card application as a meta data, which will be utilized later for creating an instance of the application. Key profile & key 505 describes basic profile information and key information as a metadata, which will be utilized for creating an instance of the key. ISD master keys are also registered in the system, including Initial Supplier Key (ISK), Initial Issuer Master Key (KMC), and Final Issuer Master Key (CMK). SE profile 506 describes attributes of a smart card. And lastly, handset profile 507 describes attributes of a handset device, including NFC capability, supported SE types, and OTA channel support.

Once all of the necessary profiles have been provided to the TSM system, the TSM system will establish link between the provided profiles in step 508. The provided profiles may be provided to the TSM system in various ways. The profiles may be sent to the TSM system directly through the network, by physical embodiments of provided data, or any other conventional method that is available to transfer information. Once the provided profiles have been linked with one another, a check is conducted to verify compatibility with the aggregated business rules and or technical limitations in step 509. For example, a business rule may dictate that a certain MNO may not work with a SP for business reasons. Based on this business limitation, the TSM system may sever linkage between profiles to reflect this limitation. In addition, there may be some technical limitations in providing certain products to user mobile device, such as incompatible mobile operating systems. By configuring the described limitations in step 509, the mobile device user may access only the applications that may be valid to their mobile device and specific account attributes.

Figure 6:
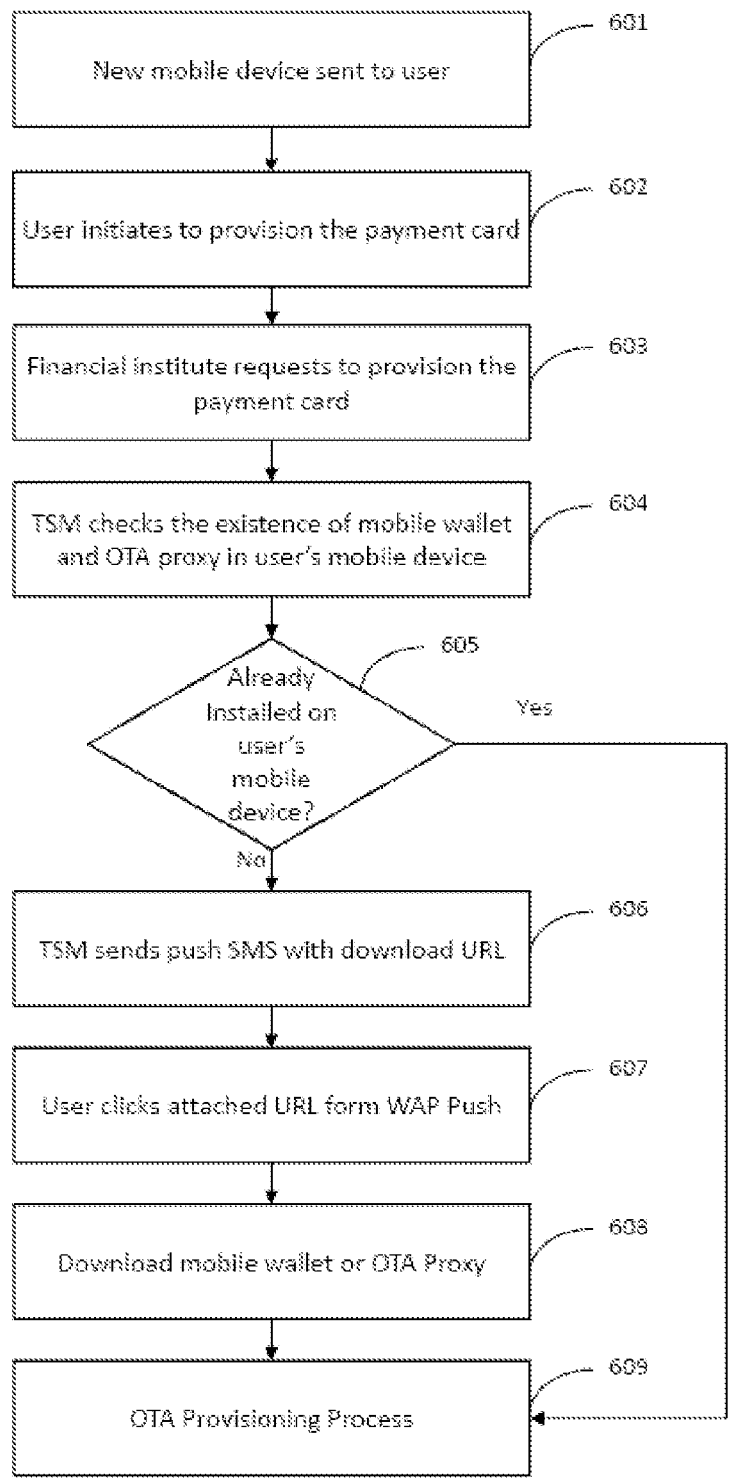
FIG. 6 is a flow diagram illustrating a method of obtaining a mobile wallet application with accompanying OTA proxy application according to an exemplary embodiment of the present invention.

FIG. 6 shows a method for downloading OTA Proxy as an attached application to a SK C&C wallet mobile application according to an exemplary embodiment of the present invention.

In step 601, new mobile device is obtained by the user. The user in receipt of the mobile device initiates the payment card issuance request to the card provider in step 602. This request may be made in person, by phone, internet request, or via mobile web service. It is assumed that a physical credit card account already exists with the issuing payment card provider. Some of the information that may be required includes personal information and handset information (MNO, Mobile Subscriber Integrated Services Digital Network Number (MSISDN)). Once the financial institution receives the request by the user and authenticates the user as one of its customer, the respective financial institution will forward the request onto the TSM system in step 603.

When TSM system receives the request, TSM will first authenticate the SP account for its validity. TSM may then perform a check to verify existence of a mobile wallet application and an OTA proxy associated with the requesting user account in step 604 in its system. In an example, the mobile wallet application may include an accompanying OTA proxy application, which may also be indicated in the user account. Alternatively, the mobile wallet application may not include the OTA proxy application, which may be obtained separately from is the mobile wallet application.

Further, the TSM system may conduct this check by using identifying information provided by the user, which may include a mobile phone number, account number, birth date, or other identifying information. Alternatively, in an example, the TSM system may perform a check to verify the existence of the OTA proxy application associated with the user account separately from the mobile wallet application.

Accordingly, if a user is a new customer, the TSM system may be unable to identify a mobile wallet application or an OTA proxy application associated with the user account. However, if the new customer later obtains and activates a mobile wallet application, the TSM system may create a mobile wallet application associated with the user account identifying information when the user mobile device with the newly activated mobile wallet application connects to the TSM system. Further, if the mobile wallet application also includes a corresponding OTA proxy application, information regarding the OTA proxy application will also be noted on the user account. Similarly, if the new customer later obtains and OTA proxy separately from the mobile wallet application, the TSM system may update its account information to note the possession of the OTA proxy application independent of the mobile wallet application.

It should be noted as OTA proxy allows for provisioning account specific information OTA to non-UICC SEs, certain mobile wallet applications may opt to add OTA proxy as an accompanying application. However, it is possible to provide OTA proxy software application independent of the mobile wallet application. In an example, the TSM system will check for existence of both a mobile wallet and an OTA proxy application. As some of the mobile wallet applications may have accompanying OTA proxy application, existence of one is may provide existence of the other. However, if only one application is tied to the requesting user account, the TSM system will provide the deficient application for the user. Accordingly, if OTA proxy application is not associated with the user account, OTA proxy may be provided to the requesting user as described in step 606 below. Once the OTA proxy application is downloaded onto a mobile device, OTA proxy may integrate itself with a third party wallet application to allow OTA provisioning into the third party wallet application. While OTA proxy may be used in the mobile wallet application, it should be noted that OTA proxy software application is not limited to its use with the mobile wallet application and may be integrated with other software applications for mobile devices.

If the requesting user in step 602 has a mobile wallet application with the accompanying OTA proxy as determined in step 605, OTA provisioning process will occur immediately in step 609.

However, if the requesting user in step 602 does not have a mobile wallet application or the accompanying OTA proxy as determined in step 605, TSM will send a push SMS message with a download URL to the requesting mobile device in step 606. SMS message may include URL, MSISDN, service ID, and service account number.

In step 607, the requesting user will view the SMS and triggers the attached URL to form a WAP push message to the TSM system with the appropriate identifier. As a response, TSM system will authenticate the customer and customer's handset by the given token and HTTP headers. TSM system will then send the mobile wallet and the accompanying OTA proxy application in step 608. However, mobile wallet and the OTA proxy application may be obtained in various other ways as well and are not limited to the SMS message as described above. The specified applications may be downloaded directly to the requesting mobile device, is sent to the user in a physical medium storing the applications, or by any other suitable method of providing an application to a mobile device.

Ideally, once the mobile wallet application has been installed onto the mobile device, the customer will launch the mobile wallet application. Once launched, the mobile wallet application, through OTA proxy, will gather SE information (Card Production Life Cycle (CPLC), Card Serial Number (CSN), Card Image Number (CIN), Integrated Circuit Card Identification (ICCID)) and handset information (International Mobile Equipment Identity (IMEI)/Mobile Equipment Identifier (MEID), MSISDN) and connect to the TSM system for activation. If the SE is a UICC type, it will read both the SE information and handset information from the UICC card. If however, SE is a Micro SD or Embedded SE, OTA Proxy will read the CIN from the SE and then obtain MSISDN and IMEI/MEID via mobile device application programming interface (API). Based on the information provided by OTA proxy, the TSM system will authenticate the received information and create a Mobile ID for the installed wallet application.

Once the mobile wallet application and accompanying OTA proxy has been installed, the originally requested mobile wallet card may be provisioned through OTA via OTA proxy in step 609.

Figure 7:
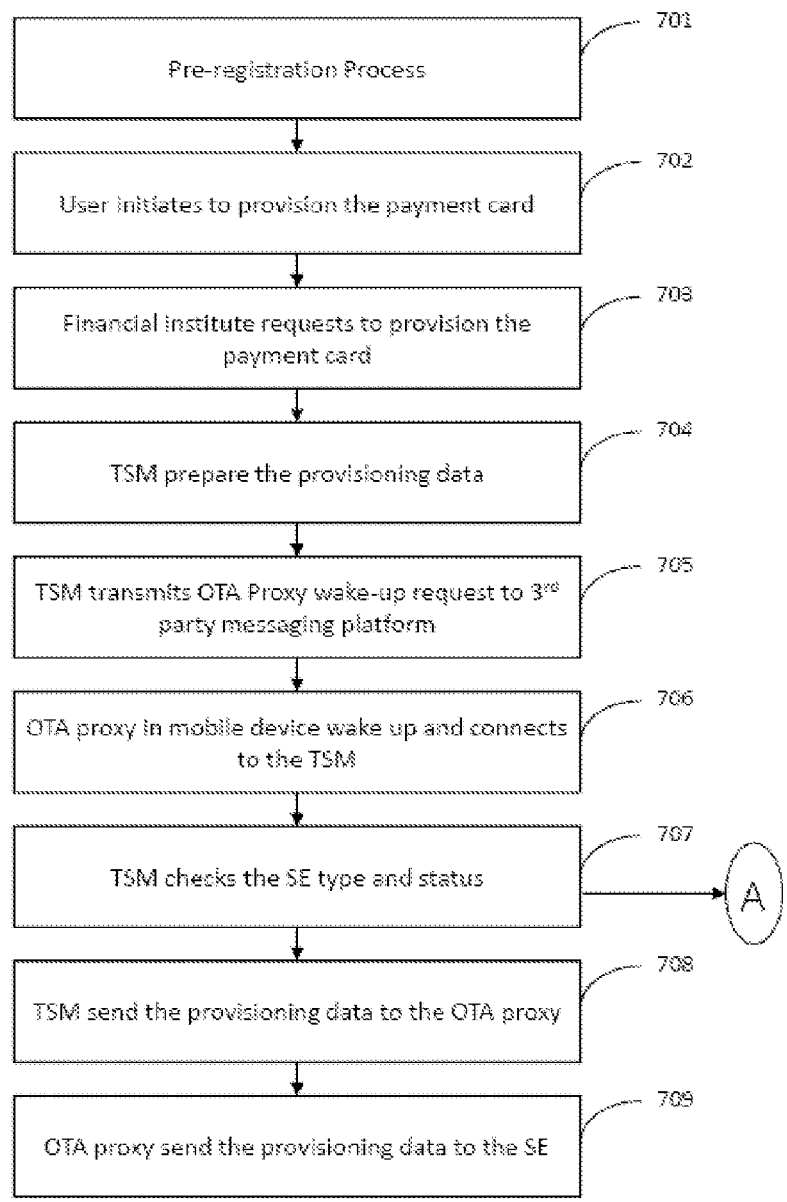
FIG. 7 is a flow diagram illustrating a high level OTA provisioning process though OTA proxy according to an exemplary embodiment of the present invention.

FIG. 7 is a flow diagram illustrating the general OTA provisioning process via OTA proxy according to an exemplary embodiment of the present invention. Once the requesting mobile device has installed a mobile wallet and accompanying OTA proxy application, provisioning process follows the process outlined below.

Prior to any provisioning of mobile card application, the issuing service provider will be ideally pre-registered into the TSM system as shown in step 701 as described in detail in FIG. 5. Once registered, a customer may select a registered SP's payment card for provisioning by the mobile device owner in step 702.

Once a request has been made to provision the selected mobile payment card, the financial institution service provider will request its issuance to the TSM system in step 703. Request for service subscription may include identifying information such as MSISDN along with encrypted account related information that is to be provisioned.

TSM in response to the request will begin preparation of the provisioning data in step 704. Upon receipt of provisioning information, internal data link will be conducted to log the service request made by the financial institution. One of the information that will be maintained is a portion of the payment card account data which will be utilized to identify card account to the requesting user within the TSM system. For security purposes, the entire account number need not be maintained.

In step 705, TSM system transmits an OTA proxy wake-up request to a push server.

Once the request has been logged in the TSM system, TSM will then push the wake up request command to a third party messaging platform or a mobile push server (e.g. C2DM) along with identifying information (i.e. MSISDN), which will in turn relay the command to wake up the OTA proxy residing in the requesting user's mobile device in step 706.

In a preferred embodiment of this invention, OTA proxy will be expected to be asleep prior to being awaken. Once OTA proxy is woken, it connects to the TSM system automatically. Upon connection, OTA Proxy gathers the SE and handset specific information and sends the collected information to TSM for verification. However, OTA Proxy may gather the specified information prior to connection or provide the information to the TSM system in a is separate process. In receipt of provided information, the TSM system conducts an internal check to see if the MSISDN, IMEI/MEID, CIN/ICCID of handset and SE match the user information stored in the TSM server. As this check is conducted every time OTA proxy is initialized, additional security is provided verifying account specific information storage SE with the mobile device which houses the SE.

Once OTA proxy connects to TSM with the collected information and security check has been conducted, TSM will analyze the provided data for any additional processing SE may require and the best mode of provisioning the information into the respective mobile device in step 707. This analysis is described in detail in FIG. 8.

After the best mode of provisioning has been determined, TSM prepares the data as necessary and sends the provisioning data in APDU format to the OTA proxy in step 708. OTA proxy in receipt of APDU commands by TSM relays the provisioning data to the SE in step 709.

OTA proxy is allowed access to the non-UICC SEs through the various keys that have been loaded onto the TSM device along with SE specific APIs which are exchanged offline. Through the incorporation of these attributes, OTA proxy protocol is provided access to the SE to be provisioned.

Figure 8:
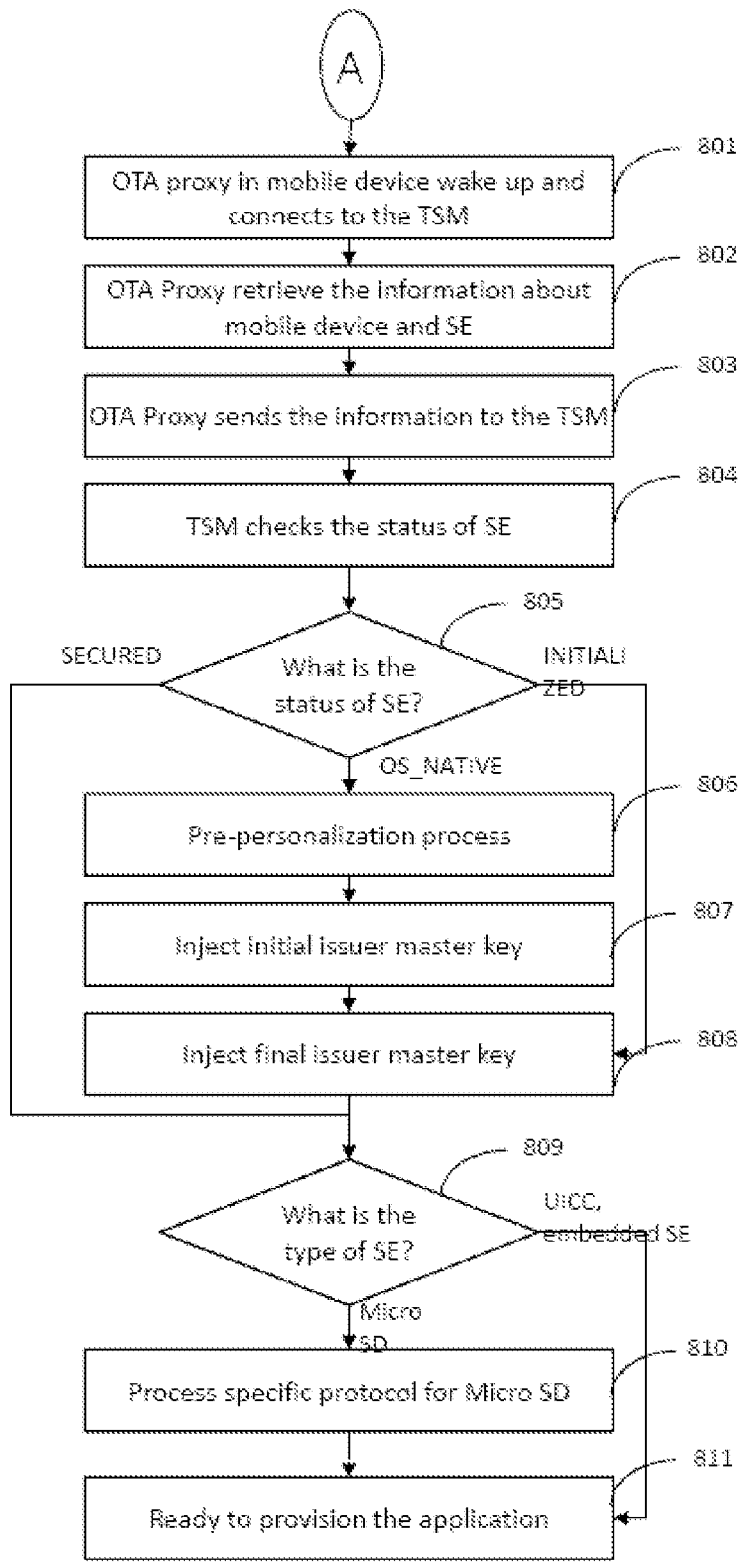
FIG. 8 is a flow diagram illustrating in detail a method of verifying SE types and status as required to provision into various types of SEs according to an exemplary embodiment of the present invention.

FIG. 8 illustrates a detailed description for checking of SE status and type performed by the TSM system prior to provisioning as outlined in step 707 in FIG. 7.

In step 801, after OTA proxy receives a wake up command from the third party messaging platform or the mobile push server originating from the TSM system, OTA wakes up and connects to the TSM system to retrieve the requested command.

In step 802, the OTA proxy retrieves SE and mobile device specific information is such as MSISDN and CIN. Once the necessary information has been gathered, OTA proxy sends the information to TSM in step 803 for verification and analysis of requesting device. Communications between the TSM system and the OTA proxy may be provided through a standard mobile network, wireless network, or similar mechanisms.

In step 804, once the TSM system receives mobile device and SE information, the TSM system checks the status of SE. As processing of stored SE is dependent on its status, analysis of SE status is important prior to its provisioning. SE equipped in the mobile device may have any of the 3 statuses: OS native, initialized, and secured. In an example, OS Native status may refer to a status of the SE that is not initialized according to manufacturer's initialization method, initialized status may refer to an administrative card production state, and secured status may refer to an intended operating life cycle in post-issuance.

If the status of SE is determined to be as already secured in step 805, then it proceeds to step 809 which checks for the type of SE.

If the status of SE is determined as initialized in step 805, then the TSM will provide a final issuer master key for provisioning prior to proceeding to step 809.

If the status of SE is determined to be OS native in step 805, then pre-personalization process may take place in step 806. Afterwards, an initial issuer master key may be injected into the SE for provisioning in step 807. Once the initial issuer master key is injected, a final issuer master key may be injected as shown in step 808, prior to proceeding to step 809.

After status of the SE has been determined, an analysis of SE type is performed in step 809 in order to determine the type of protocol that should run within OTA proxy in order to provision into the identified SE.

If the SE is a UICC type or an embedded type, application is ready to provision in step 811 and moves to step 708 in FIG. 7.

On the other hand, if the SE is a Micro SD type, additional process specific protocol should be executed for MicroSD in step 810, before it can be ready to be provisioned in step 811.

Figure 9:
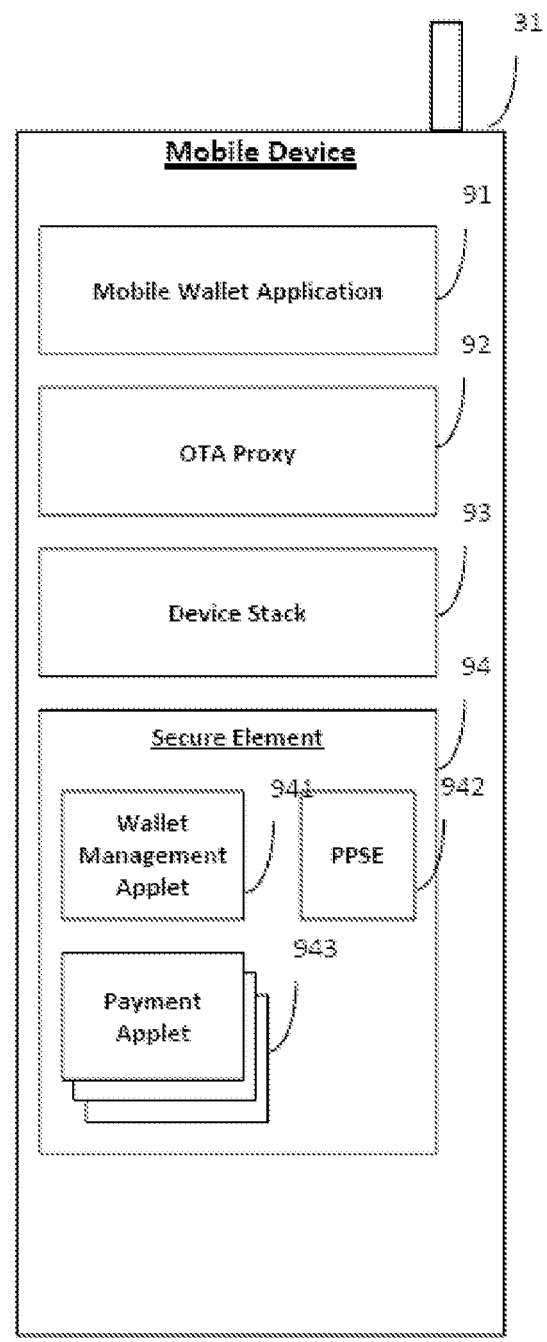
FIG. 9 is a system diagram depicting mobile device that has installed a mobile wallet application, accompanying OTA Proxy application and wallet management applet, and payment applets according to an exemplary embodiment of the present invention.

FIG. 9 illustrates exemplary provisioned mobile device according to an embodiment of the present invention. The mobile device illustrated in FIG. 9 represents an exemplary mobile phone, however, the mobile device embodying the present invention may be any mobile device, such as a personal digital assistant (PDA), a mobile computer device, or other similar mobile communicative devices.

Once the mobile device 31 has been provisioned according the present disclosure, the mobile device 31 may be comprised of the apparatus itself; mobile wallet application 91 software; OTA Proxy application 92 software; Device Stack 93 software; and Secure Element 94 hardware.

Mobile wallet application 91, such as a SK C&C wallet, provides the user with a graphically displayed mobile wallet, which includes various components such as payment widgets that are tied to the installed NFC enabled payment applets 943, as well as other components (e.g. coupons, transport pass, phone bill, and etc.).

The OTA Proxy 92 is a mobile client which supports OTA post-issuance related services to the secure element in a mobile device. More specifically, OTA proxy provisions confidential information, such as financial applications and related account information into non-UICC type SE equipped on a mobile device. As SE types, Micro SD and Embedded SEs cannot support conventional SAT/SUSAT/CAT framework, OTA provisioning is unavailable using the is conventional technology for the specified SE types. OTA Proxy over OTA overcomes this limitation and allows any external party to send data to mobile devices equipped with the specified non-UICC SE types. However, if desired, OTA proxy can also provide an alternative protocol, over the conventional protocol, to UICC SE devices which can support conventional SAT/SUSAT/CAT framework.

In an example, OTA Proxy is able to gain access to the non-UICC SE types by using the keys to the SE provided by the manufacturers. The respective keys to the non-UICC types may be obtained by having the manufacturers register the information to the TSM system, through an offline exchange, or any other conventional methods. Further, the obtained keys may be integrated into the OTA Proxy application or may be used separate from the OTA Proxy application.

Device Stack 93 is a standard handset platform which facilitates the mobile device operations. No modification is done to this component and is illustrated only to provide an accurate visual representation.

SE 94 may be further comprised of a Wallet Management Applet (WMA) 941 software; Payment Procedure Secure Elements (PPSE) 942 software; and Payment Applet(s) 943 software. When a payment applet 943 is provisioned into the SE 940 of the mobile device, it is located in a secure domain within the SE where external parties may not have access to the account sensitive information that is stored within the payment applet.

In order for retailers and manufacturers to select a specific payment applet, PPSE 942 manages relevant Application ID and Application label of the payment applet for selection. However, as mobile devices cannot access the payment applets directly, a separate WMA 941 is required for the management of mobile wallet cards stored within mobile wallet application.

During the provisioning process, WMA 941 will store duplicate payment applet account information so that mobile wallet application may access the account specific information stored within the SE. Like the contactless payment applets, WMA 941 is stored in a separate security domain within the SE.

Figure 10:
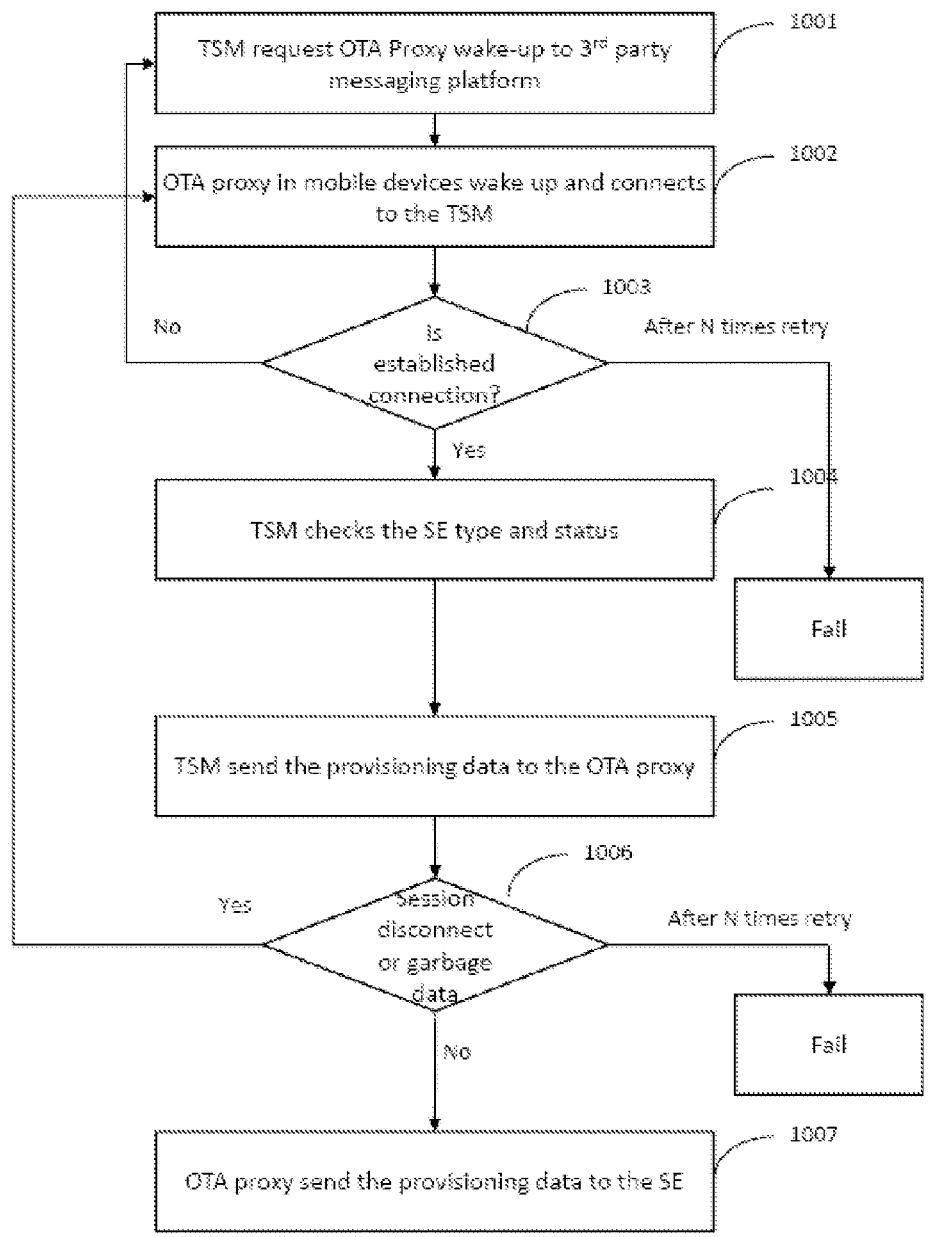
FIG. 10 is a flow diagram illustrating operation of a retry mechanism to ensure reliable data transmission according to an exemplary embodiment of the present invention.

FIG. 10 is a flow diagram illustrating a retry mechanism which operates to ensure successful provisioning process via OTA proxy. As connections between mobile device and external entities may be subject to disconnection for various reasons, OTA proxy is designed to authenticate its connection to the TSM server.

In step 1001, TSM makes a request to a third party messaging platform or a mobile push server to wake up OTA proxy. Once OTA proxy is woken up, it connects to the TSM in step 1002. After a preset period of time, OTA proxy checks to see if the connection to the TSM was made in step 1003.

If no connection was made, or the connection was lost, TSM will reattempt to connect to the OTA Proxy by submitting another request to the mobile server as described in step 1001. However, if no connection is made after a preset N number of retries, TSM will log the attempt to wake up the OTA Proxy as a failure. Notification of this failure may be provided to the requesting SP.

Once connection to the TSM is made by the OTA Proxy, TSM checks the SE type and status for provisioning in step 1004. Subsequently, TSM processes the information and produce APDU commands to send over to OTA Proxy in step 1005. If the connection to the OTA proxy is disconnected during the sending of APDU commands or TSM system receives unusable data, then OTA proxy will retry its connection to the TSM system as defined in 1002 and subsequent processes will be executed. However, if session continues to disconnect or is unusable data is returned after the Nth try, a failure is logged at the TSM server and notification will be sent to the relevant parties.

If the session disconnects or garbage provisioning data is determined to have transmitted from the TSM system to the OTA proxy in step 1006, the TSM will reattempt to connect to the OTA Proxy and resend the provisioning data to the OTA proxy by repeating steps 1002 to 1005. However, if the session continues to disconnect during the transmission of the provisioning data or garbage provisioning data continues to be sent after a preset N number of retries, TSM will log the attempt to provision the requested data as a failure. Notification of this failure may be provided to the requesting SP. Alternatively, if the provisioning data is successfully received by the OTA proxy, then the OTA proxy relays the provisioning data to the SE in step 1007.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for over-the-air (OTA) provisioning a non-Universal Integrated Circuit Card (UICC) type secure element (SE) of a mobile device, the method comprising:
   selecting, by the mobile device, a payment card of a service provider among a plurality of service providers after the service provider has been pre-registered into a Trusted Service Manager (TSM) system, wherein the TSM system has held all of the information from the plurality of service providers through a pre-registration process;

sending, by the service provider, to the TSM system, a request for issuance of the selected payment card when the service provider receives from the mobile device a request to provision the selected payment card, wherein the request for issuance includes identifying information and encrypted account related information;

receiving, by the mobile device, a request to initialize an OTA proxy of the mobile device from the TSM system without the mobile device interacting with the service provider;

initializing, by the mobile device, the OTA proxy;

preparing, by the TSM system, provisioning data;

receiving, by the mobile device, the provisioning data through the OTA proxy from the TSM system without the mobile device interacting with the service provider, wherein (a) the TSM system has determined a mode of provisioning and sent the provisioning data through the determined mode of provisioning, (b) the TSM system has checked a status of the SE and a type of the SE prior to sending the provisioning data based on information of the mobile device and of the SE having been received from the mobile device, and (c) after the TSM system has determined the status of the SE, the TSM system has analyzed the type of the SE to determine a type of protocol to be used within the OTA proxy of the mobile device in order to provision into the SE; and provisioning, by the mobile device, the received provisioning data into the SE, wherein the preparing of the provisioning data further includes processing a protocol to enable the SE to be provisioned when the SE type is a Micro secure digital (SD) type, wherein the method further comprises preparing the SE for provisioning, and the preparing of the SE for provisioning comprises:

retrieving mobile device information and SE information, wherein the SE information comprises an SE status and an SE type;

receiving a key for accessing the SE from the TSM system; and securing the SE based on the SE status.

2. The method of claim 1, further comprising:

requesting the OTA proxy to be installed from the TSM system;

receiving the OTA proxy to be installed; and installing the received OTA proxy in the mobile device.

3. The method of claim 1, wherein the initializing of the OTA proxy comprises:

waking the OTA proxy from a dormant state;

gathering mobile device information of the mobile device;

communicating, by the mobile device, with the TSM system through the OTA proxy; and transmitting the mobile device information to the TSM system.

4. The method of claim 1, wherein the receiving of the provisioning data through the OTA proxy comprises:

receiving the provisioning data as Application Protocol Data Unit (APDU) commands through the OTA proxy, wherein the TSM system converts the provisioning data into the APDU commands.

5. The method of claim 4, wherein the provisioning of the received data into the SE comprises provisioning the APDU commands.

6. The method of claim 1, wherein the request to initialize the OTA proxy is received through a push server.

7. The method of claim 1, wherein the mobile device information comprises at least one of International Mobile Equipment Identity (IMEI), Mobile Equipment Identifier (MEID), and Mobile Subscriber Integrated Services Digital Network Number (MSISDN).

8. The method of claim 1, wherein the key comprises at least one of an initial issuer master key and a final issuer master key.

9. The method of claim 8, wherein the securing of the SE comprises providing the initial issuer master key and the final issuer master key to the SE in response to a determination that the SE status is Operating System (OS) native.

10. The method of claim 8, wherein the securing of the SE comprises providing the final issuer master key to the SE in response to a determination that SE status is initialized.

11. The method of claim 3, wherein the communicating, by the mobile device, with the TSM system through the OTA proxy comprises reattempting to communicate with the TSM system in response to a failure to communicate with the TSM system by the mobile device.

12. The method of claim 1, wherein the receiving of the provisioning data comprises reconnecting to the TSM system and requesting to receive the provisioning data in response to receipt of unusable data or in response to a session disconnection during an attempted receiving of the provisioning data.

13. A method for over-the-air (OTA) provisioning a non-Universal Integrated Circuit Card (UICC) type secure element (SE) device, the method comprising:

selecting, by the mobile device, a payment card of a service provider among a plurality of service providers after the service provider has been pre-registered into a Trusted Service Manager (TSM) system, wherein the TSM system has held all of the information from the plurality of service providers through a pre-registration process;

sending, by the service provider, to the TSM system a request for issuance of the selected payment card when the service provider receives from the mobile device a request to provision the selected payment card, wherein the request for issuance includes identifying information and encrypted account related information;

receiving, by the mobile device, a request to initialize an OTA proxy of the mobile device from the TSM system without the mobile device interacting with the service provider;

initializing, by the mobile device, the OTA proxy;

communicating, by the mobile device, with the TSM system through the OTA proxy;

retrieving, by the mobile device through the OTA proxy, mobile device information and SE information, wherein the SE information comprises an SE status and an SE type;

receiving, by the mobile device through the OTA proxy, a key from the TSM system for accessing the SE, wherein the key comprises at least one of an initial issuer master key and a final issuer master key;

securing, by the mobile device through the OTA proxy, the SE by providing the corresponding key to the SE based on a the status of the SE;

preparing, by the TSM system, provisioning data;

receiving, by the mobile device through the OTA proxy, the provisioning data from the TSM system without the mobile device interacting with the service provider, wherein (a) the TSM system has determined a mode of provisioning and sent the provisioning data through the determined mode of provisioning, (b) the TSM system has checked the status of the SE and the type of the SE prior to sending the provisioning data based on information of the mobile device and of the SE having been received from the mobile device, and (c) after the TSM system has determined the status of the SE, the TSM system has analyzed the type of the SE to determine a type of protocol to be used within the OTA proxy of the mobile device in order to provision into the SE; and provisioning, by the mobile device through the OTA proxy, the received data into the SE, wherein the preparing of the provisioning data includes processing a protocol to enable the SE to be provisioned when the SE type is a Micro secure digital (SD) type.

14. The method of claim 13, wherein the processing of the protocol comprises processing the protocol to receive the provisioning data.

15. The method of claim 13, wherein the request to initialize the OTA proxy is received at the mobile device through a push server.

16. A mobile device configured to provision secure data over-the-air (OTA) in a non-Universal Integrated Circuit Card (UICC) type secure element (SE), the mobile device comprising:

an OTA proxy configured to connect to a Trusted Service Manager (TSM) system, to select a payment card of a service provider among a plurality of service providers after the service provider has been pre-registered into the TSM system, and to receive provisioning data from the TSM system, wherein (i) the TSM system has held all of the information from the plurality of service providers through a pre-registration process, (ii) the TSM system has determined a mode of provisioning and sent the provisioning data through the determined mode of provisioning, (iii) the TSM system has checked a status of the SE and a type of the SE prior to sending the provisioning data based on information of the mobile device and of the SE having been received from the mobile device, and (iv) after the TSM system has determined the status of the SE, the TSM system has analyzed the type of the SE to determine type of protocol to be used within the OTA proxy of the mobile device in order to provision into the SE;

a near-field-communication (NFC) enabled device configured to conduct a contactless transaction; and a SE configured to store information provisioned through the OTA proxy, wherein the mobile device is configured to interact with the TSM system without service providers (SPs), the TSM system holding all of the information related to a provisioning procedure from the service providers (SPs) through a pre-registration process, wherein the OTA proxy of the mobile device is configured to be initialized when the mobile device receives a request to initialize the OTA proxy transmitted from the TSM system, wherein the OTA proxy is further configured to receive a protocol to prepare the SE to be provisioned, wherein the mobile device is configured to send to the service provider a request to provision the selected payment card, whereby the TSM system receives, from the service provider, a request for issuance of the selected payment card to the mobile device, wherein the request for issuance includes identifying information and encrypted account related information, wherein the OTA proxy is configured to transmit mobile device information and SE information to the TSM system, and the SE information comprises the SE status and the SE type; and wherein the type of SE is a Micro secure digital (SD) type.

17. The mobile device of claim 16, wherein the mobile device information comprises at least one of International Mobile Equipment Identity (IMEI), Mobile Equipment Identifier (MEID), and Mobile Subscriber Integrated Services Digital Network Number (MSISDN).

18. The mobile device of claim 16, wherein the OTA proxy is configured to receive a key from the TSM system to access the SE based on the SE information sent to the TSM system, wherein the key comprises at least one of an initial issuer master key and a final issuer master key.

19. The mobile device of claim 16, wherein the mobile device further comprises a mobile wallet application comprising a widget corresponding to the information stored in the SE.

20. The mobile device of claim 16, wherein the OTA proxy is an OTA proxy installed in the mobile device.

21. The mobile device of claim 19, wherein the information stored in the SE comprises:

a Payment Procedure Secure Elements (PPSE) configured to store a contactless card applet; and a wallet management applet (WMA) corresponding to the contactless card applet.

\* \* \* \* \*